United States Patent [19]

Zarr

[11] Patent Number: 4,534,523
[45] Date of Patent: Aug. 13, 1985

[54] TAPE GUIDANCE FOR BELT DRIVEN CARTRIDGE

[75] Inventor: Myron Zarr, St. Paul, Minn.

[73] Assignee: Minnesota Mining and Manufacturing Company, St. Paul, Minn.

[21] Appl. No.: 626,137

[22] Filed: Jun. 29, 1984

[51] Int. Cl.$^3$ .................... G03B 1/04; G11B 15/32
[52] U.S. Cl. ..................... 242/192; 226/189; 226/196; 242/76
[58] Field of Search ............... 242/76, 192, 197-200; 226/189, 196, 197, 199; 360/132, 137; 474/140, 173

[56] References Cited

U.S. PATENT DOCUMENTS

| | | | |
|---|---|---|---|
| 3,692,255 | 9/1972 | Von Behren | 242/192 |
| 4,076,186 | 2/1978 | Oishi et al. | 242/199 |
| 4,131,243 | 12/1978 | Machida | 242/199 |
| 4,162,774 | 7/1979 | Bowers | 242/192 |
| 4,232,350 | 11/1980 | Ohta | 360/132 |
| 4,367,854 | 1/1983 | Saitou | 242/198 |

Primary Examiner—Leonard D. Christian
Attorney, Agent, or Firm—Donald M. Sell; James A. Smith; David W. Anderson

[57] ABSTRACT

A tape cartridge of the type including walls defining an enclosure in which a magnetic tape is directed along a tape guidance path adjacent an edge of the cartridge for access by a magnetic transducer further includes at least three pins bearing against one or both major surfaces of the tape in a direction perpendicular to the plane of the tape, an enlarged shoulder extending from each of the pins toward the tape to bear upon an edge of the tape and provide a containment force parallel to the plane of the tape and in a direction transverse to the direction of tape motion. The shoulders of the pins are arranged alternately along the tape path so that the shoulders of successive pins bear against opposite edges of the tape, and the planes containing the shoulders are spaced a distance equal to or less than the width of the tape to ensure contact between all of the shoulders and the tape edges and positive confinement of the tape in the direction transverse to tape motion.

3 Claims, 4 Drawing Figures

TAPE GUIDANCE FOR BELT DRIVEN CARTRIDGE

BACKGROUND OF THE INVENTION

1. Field of the Invention

The present invention concerns improved tape guidance between the spools of a two-spool tape cartridge in which a flexible, elastic drive belt contacts the tape on the tape spools and whereby movement of the belt causes movement of the tape between the spools.

2. Description of the Prior Art

The belt driven tape cartridge of U.S. Pat. No. 3,692,255, issued to Von Behren and assigned to the assignee of the present invention, has been very successfully utilized to interface with computers where rapid acceleration and deceleration of the tape are required. In the cartridge there disclosed, a magnetic recording tape is convolutely wound on two tape spools and is bidirectionally driven between the spools by an endless flexible belt in frictional contact with the tape on both spools.

When the cartridge of the Von Behren patent was first marketed in 1972, its magnetic recording tape had a width of ¼ inch (6.35 mm), a thickness of 1 mil (0.025 mm), and was driven at 30 inches (762 mm) per second. Data were originally recorded on the tape at a density of 1600 flux reversals per inch (63 per mm). Current cartridges come in a variety of sizes and the recording tapes range in width from 0.150 inches (3.81 mm) to 0.250 inches (6.35 mm), may be as thin as 0.6 mil (0.015 mm), may be driven at 90 or more inches (2286 mm) per second, and data is recorded at densities of 10,000 flux reversals per inch (394 per mm) or more. In addition, data are recorded on a plurality of independent, parallel tracks, which may number in excess of 32, spaced across the width of the magnetic recording tape.

Although no problems were encountered when the cartridge was first introduced, the higher tape speeds, recording densities, and track densities have created a need for improved tape guidance along its path through the cartridge.

SUMMARY OF THE INVENTION

The present invention discloses a tape guidance arrangement which directs the tape parallel to an edge of the cartridge and provides positive confinement of the tape in the direction transverse to tape motion.

Particularly, the tape guidance arrangement is utilized in a tape cartridge of the type including walls defining an enclosure in which a magnetic tape is directed along a tape guidance path parallel to an edge of the cartridge for access by a magnetic transducer, and includes at least three tape guidance surfaces bearing against one or both major surface of the tape in a direction perpendicular to the plane of a tape, each of the tape guidance surfaces including at least one enlarged shoulder extending from the tape guidance surface toward the tape to bear upon an edge of the tape and provide a confinement force parallel to the plane of the tape and in a direction transverse to the direction of tape motion, wherein the shoulders of the tape guidance surfaces are arranged alternately along the tape path so that the shoulders of successive tape guidance surfaces bear against opposite edges of the tape, and wherein the planes containing the shoulders are spaced a distance equal to or less than the width of the tape to ensure contact between all of the shoulders and the tape edges and positive confinement of the tape in a direction transverse to tape motion.

The tape guidance surfaces may be provided by cylindrical pins extending between the walls which define the enclosure and the tape edge bearing shoulders may be provided by an enlarged diameter of the pin or a flat end of a leaf spring which bears against the end of a pin extending a predetermined distance from one of the enclosure walls.

BRIEF DESCRIPTION OF THE DRAWINGS

The present invention will be more thoroughly described with reference to the accompanying drawings, wherein like numbers refer to like parts in the several views, and wherein.

DESCRIPTION OF THE PREFERRED EMBODIMENTS

Figure 1:
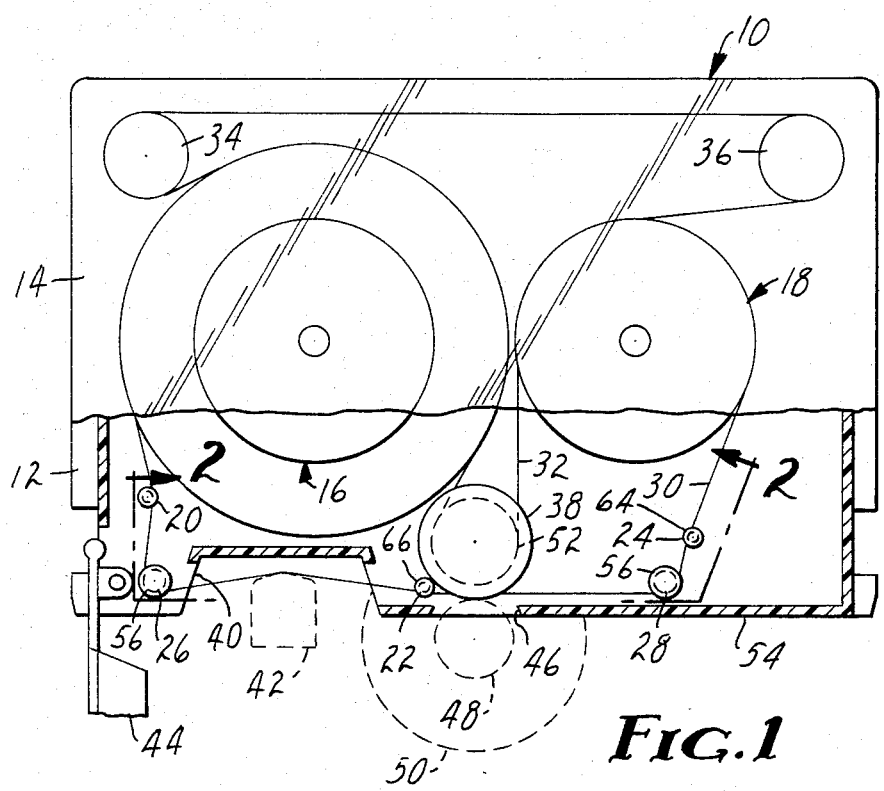
FIG. 1 is a top plan view of a belt drive tape cartridge, partially in section, containing an improved tape guidance arrangement of the present invention.

FIG. 1 illustrate a data cartridge 10 of the type described in U.S. Pat. No. 3,692,255 (Von Behren) which includes a thin base plate 12, usually of aluminum, and a clear or translucent polymeric cover 14, which, when assembled, define a thin, generally rectangular enclosure. Enclosed within the data cartridge 10 are a pair of tape spools 16 and 18, three tape wrap pins 20, 22 and 24, a pair of tape guides 26 and 28, a length of magnetic recording tape 30, a driving belt 32, a pair of belt guide rollers 34 and 36, and a belt driving roller 38.

The tape spools 16 and 18 are supported by the cartridge base plate 12 for free rotation about spaced parallel axes. The magnetic recording tape 30 is convolutely wound on the tape spools 16 and 18 in opposite directions about their axes. The tape 30 guidance path between the tape spools 16 and 18 is defined by the three tape wrap pins 20, 22 and 24 and the two tape guides 26 and 28.

The cartridge 10 is formed with a cutaway portion 40 along the tape path which provides access to the magnetic tape 30 by a magnetic transducer 42. The cutaway portion 40 is normally closed by a spring-loaded door 44 which is opened as shown upon insertion of the data cartridge 10 into a tape recorder (not shown). A second opening 46 is provided in the cartridge cover 14 to provide access to the belt driving roller 38 by a drive roller 48 driven by a reversible motor 50. The magnetic transducer 42, the drive roller 48, and the reversible motor 50 are illustrated in phantom lines as they form a portion of the tape recorder rather than the data cartridge 10.

The cartridge belt driving roller 38 is provided with a reduced diameter 52 to prevent contact between the driving belt 32 and the magnetic recording tape 30. The driving belt 32 is thin, continuous, flexible and elastic. It has a uniform cross-sectional area and it extends around the belt driving roller 38 and the belt guide rollers 34 and 36, contacting the tape 30 on the tape spools 16 and 18.

The length of the belt 32 is less than the length of the path along which it extends so that when the belt 32 is stretched into position it will have an installed tension or pretension. The angle of wrap of the driving belt 32 at the tape spools 16 and 18 is at least 60 degrees and provides the necessary contact between the belt 32 and the tape 30 wound on the tape spools 16 and 18 to assure frictional driving of the tape 30 and the tape spools 16 and 18.

Rotation of the belt driving roller 38 in a counterclockwise direction (as viewed in FIG. 1) by the drive roller 48 causes the belt 32 to traverse its path in a counterclockwise direction and the tape 30 to move from the tape spool 18 to the tape spool 16, the tape spool 18 serving as a supply spool and the tape spool 16 serving as a take-up spool. Opposite rotation of the driving roller 38 by the drive roller 48 will cause tape 30 to be supplied by the tape spool 16 and convolutely wound upon the tape spool 18. A predetermined frictional coupling between the belt guide rollers 34 and 36 and their respective support shafts applies a predetermined drag to the belt 32 as it passes around the guide rollers 34 and 36, thereby increasing the tension of the belt 32 as it passes around each of the belt guide rollers 34 and 36. This increased tension in the belt 32 increases the length of the belt 32 according to its elasticity and thereby the speed at which the belt 32 passes around the spool 18 is increased compared to that at which it passes around the spool 16. This increased speed causes tension in the tape 30 as well as the ability to take up any slack developed in the tape 30 between the tape spools 16 and 18 as is more fully taught in U.S. Pat. No. 3,692,255.

Figure 2:
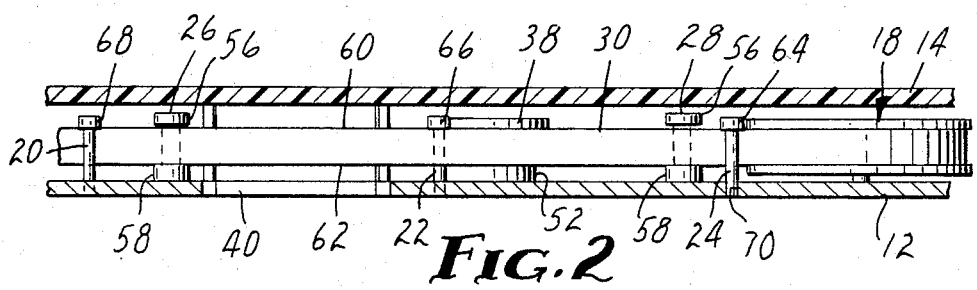
FIG. 2 is a cross-sectional view of the tape cartridge of FIG. 1 taken generally along the line 2—2 of FIG. 1.

The tape guidance arrangement of the present invention is best illustrated in FIG. 2 and includes the three tape wrap pins 20-24 and the two tape guides 26 and 28. The tape guidance arrangement is illustrated in FIG. 2 by the section taken along the line 2—2 of FIG. 1, which results in the path of the tape 30 being illustrated artificially as being planar rather than containing the turns and bends which are truly illustrated in FIG. 1. The tape wrap pins 20-24 and the tape guides 26 and 28 are effective to direct tape 30 from the spools 16 and 18, parallel to the front edge 54 of the cartridge 10 and across the cutaway portion 40 for access by the magnetic transducer 42. This tape guidance and direction of the tape parallel to the cartridge edge 54 is produced by the vertical surfaces of the pins 20-24 and the guides 26 and 28, which surfaces may be collectively referred to as tape guidance surfaces. These tape guidance surfaces form a portion of a cylindrical solid pin for convenience, but it should be recognized that the tape guidance surfaces could be a portion of a square, rectangular or other elongated structure which has contoured ends to prevent contact between the tape 30 and a sharp corner. The tape wrap pins 20-24 and the guides 26 and 28 are, therefore, manufactured in the form of cylindrical pins for manufacturing convenience but need not be so formed.

In addition to being guided parallel to the front edge 54 of the cartridge 10, the tape 30 must additionally be confined in a direction transverse to tape motion so that the tape 30 will remain in a given transverse position relative to the magnetic transducer 42. Conventionally, this transverse confinement is accomplished by the guides 26 and 28 which include upper shoulders 56 and lower shoulders 58 which bear upon the upper edge 60 and lower edge 62, respectively, of the tape 30 to prevent the tape 30 from wandering transversely from its intended path. Since the shoulders 56 and 58 are located on opposite ends of the guide rollers 26 and 28, this type of conventional tape guidance may be referred to as "opposed surface guidance". This opposed surface guidance is adequate when the tape position need only be relatively loosely controlled, but has been found to be inadequate if the transverse position of the tape 30 must be very closely controlled, as is the case where it is desired to record a number of parallel adjacent tracks across the width of the tape 30.

Opposed surface guidance is inadequate because of the tolerances required in any assembled or otherwise manufactured article. If adequate tolerance is provided so that the upper shoulder 56 and the lower shoulder 58 do not simultaneously contact the edges 60 and 62 of the tape 30, the separation of the shoulders 56 and 58 will necessarily be larger than the width of the tape 30 and the tape will be permitted to wander from shoulder to shoulder to some degree even though this wandering would not be considered excessive under normal circumstances. Very close control of the separation between the upper shoulder 56 and the lower shoulder 58 so that the shoulder separation exactly matches the width of the tape 30 is prohibitively expensive, and a tolerance in the separation of the shoulders 56 and 58 which permits this separation to become less than the width of the tape 30 may result in binding of the tape 30 and damage to the tape 30 at its edges 60 and 62.

Contact between the edges 60 and 62 of the tape 30 and the upper shoulder 56 and the lower shoulder 58 may be accepted if the tape remains in a single plane as it crosses the guide 26 or 28 because the tape 30 is then relatively free to buckle between its edges 60 and 62 and very little force is generated between the tape edges 60 and 62 and the shoulders 56 or 58. If, however, the tape 30 executes a relatively large bend in its path while between the shoulders 56 and 58, as is the case at the guides 26 and 28, the tape 30 then exhibits a relatively large column strength which resists buckling and forces the edges 60 and 62 into contact with the shoulders 56 and 58 with a large force. This may result in fraying, cutting and abrasion of the tape edges 60 and 62. Attempts to control the transverse confinement of the tape 30 throughout its path by utilizing opposed surface guidance have not, therefore, been successful since either too large a tolerance must be provided or damage to the tape 30 may occur.

These problems with opposed surface guidance have been overcome by providing a single confinement surface on each pin which alternates from one edge 60 of the tape 30 to the opposite edge 62 of the tape 30 as successive guidance surfaces are encountered. Such a guidance system may be referred to as "alternate edge guidance" and is accomplished according to the present invention by providing a shoulder 64 on the pin 24 which contacts the upper edge 60 of the tape 30, the lower shoulder 58 of the guide 28, an upper shoulder 66 on the pin 22, the lower shoulder 58 of the guide 26, and an upper shoulder 68 on the pin 20. In this system, therefore, the upper edge 60 of the tape 30 only encounters the shoulders 64, 66 and 68 of the tape wrap pins 20, 22 and 24, while the lower edge 62 of the tape 30 only encounters the shoulders 58 of the tape guides 26 and 28. Thus at no position along its travel does a portion of the tape 30 simultaneously contact opposed tape confining surfaces.

Because the distance between successive tape confinement shoulders 64, 58, 66, 58 and 68 is relatively large, the plane containing the shoulders 64, 66 and 68 can be spaced closer to the plane containing the shoulders 58 than the width of the tape 30 without damaging the tape edges 60 and 62 since the tape 30 is free to assume a somewhat sinusoidal shape throughout its travel and the edges 60 and 62 of the tape 30 will not be forced against the shoulders 58, 64, 66 and 68 with any great force. Thus accurate confinement of the tape in a direction transverse to its motion may be accomplished without risking binding of the tape 30 and consequent damage to the tape edges 60 and 62 as may be caused by inadequately spaced opposed confinement surfaces.

Figure 3:
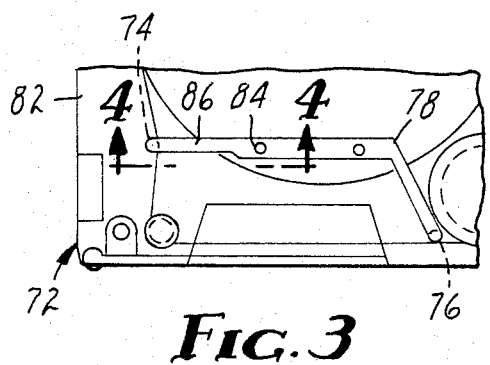
FIG. 3 is a top plan view of a belt driven tape cartridge illustrating an alternate embodiment of a tape guidance arrangement according to the present invention.

Although only the lower shoulders 58 of the guides 26 and 28 are utilized in the alternate edge guide system described above, the upper shoulders 56 of the guides 26 and 28 are retained, even though they do not normally contact the tape 30, to prevent gross movements of the tape 30 as might occur if slack were to develop in the tape 30. Furthermore, although five alternate shoulders and five successive posts have been illustrated in FIG. 3, this number is provided out of caution and is not necessary to the proper guidance of the tape 30. It should be recognized that at least three, but not more, alternate shoulders are required and that the outer (first and third) shoulders must contact an edge of the tape 30 opposite from the edge of the tape 30 contacted by the center (second) shoulder. It also should be recognized that the alternate edges 60 and 62 of the tape 30 need not be contacted in the particular order illustrated in FIG. 2. The confinement shoulders 64, 58, 66, 58 and 68 may all be located on opposite ends of their respective pins or guides, so long as the shoulders alternate as described. Thus the tape 30 in its travel from the spool 18 toward the spool 16 could first encounter a shoulder 64 which was positioned adjacent either of the tape edges 60 or 62.

It also will be seen in FIG. 1 that the pins 24 and 20 contact an opposite major surface of the tape 30 than is contacted by the pin 22 and the guides 26 and 28. It will be recognized that either major surface of the tape 30 could be contacted by any of the pins 20, 22 and 24 or the guides 26 and 28 so long as contact between the tape 30 and the pin 20, 22 and 24 and the guides 26 and 28 is maintained by proper pin or guide positioning and tape tension.

The preferred method of providing the post 24 and its associated shoulder 64 is to press fit the cylindrical pin 24 into a hole 70 provided in the cartridge plate 12, locate a split ring 64 a proper distance from the cartridge plate 12 and crimp or compress the split ring 64 to positively engage the pin 24. The shoulders 66 and 68 are assembled in like manner. It shoulder be recognized, however, that the shoulder 64 could be provided by machining the pin 24 and the shoulder 64 from a single piece of bar stock and pressing the pin 24 into the cartridge plate 12 to a desired height. The tape guide shoulders 56 and 58 may be provided also in a like manner or may be produced by impaling two rings and an interposed sleeve on a headed pin and peening the pin to the underside of the cartridge plate 12. It is recognized that many manufacturing methods may be utilized so long as a smooth tape guidance surface and a tape confinement shoulder are provided.

Figure 4:
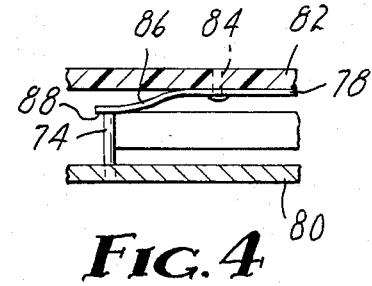
FIG. 4 is a cross-sectional view of the alternate tape guidance arrangement taken generally along the line 4—4 of FIG. 3.

FIGS. 4 and 5 illustrate yet another method of providing the tape guidance surfaces and the upper tape confinement shoulders necessary to the present invention. FIG. 4 illustrates a portion of a data cartridge 72 which is identical in all respects to the data cartridge 10 of FIG. 1 with the exception of a tape wrap pin 74, a tape wrap pin 76 and a double-ended leaf spring 78. In this method of manufacture, the pins 74 and 76 are pressed to a predetermined height in a cartridge plate 80 and the leaf spring 78 is attached to a cartridge cover 82 by means of rivets 84. The tape wrap pins 74 and 76 provide the required tape guidance surfaces and, upon assembly of the plate 80 to the cover 82, a spring arm portion 86 of the leaf spring 78 bears against and is biased toward the pins 74 and 76 to provide the required tape confinement shoulder 88.

Although the present invention has been described with respect to only a limited number of embodiments, it is recognized that a number of modifications will be apparent to those skilled in the art. It is intended that all such modifications falling within the spirit and scope of the appended claims be included in the present invention.

I claim:

1. In a tape cartridge of the type including walls defining an enclosure in which a magnetic tape is directed along a tape guidance path parallel to an edge of the cartridge for access by a magnetic transducer, the improvement comprising:

at least three tape guidance surfaces bearing against one or both major surfaces of said tape in a direction perpendicular to the plane of said tape;

each of said tape guidance surfaces including at least one enlarged shoulder extending from said tape guidance surface toward said tape to bear upon an edge of said tape and provide a containment force parallel to the plane of said tape and in a direction transverse to the direction of tape motion;

said shoulders of said tape guidance surfaces being arranged alternately along said tape path so that the shoulders of successive tape guidance surfaces bear against opposite edges of said tape; and wherein the planes containing said shoulders are spaced a distance equal to or less than the width of said tape to ensure contact between all of said shoulders and said tape edges and positive confinement of said tape in said direction transverse to tape motion.

2. An improved tape cartridge according to claim 1 wherein said tape guidance surfaces are cylindrical pins and said shoulders are tubular split rings compressed into engagement with said pins.

3. An improved tape cartridge according to claim 1 wherein said tape guidance surfaces are cylindrical pins which include ends extending to a predetermined distance from one of said cartridge walls and said shoulders are flat resilient metal leaf springs extending from the other of said cartridge walls and biased into contact with said pin ends.

* * * * *